United States Patent
Wang et al.

(10) Patent No.: US 10,516,516 B2
(45) Date of Patent: Dec. 24, 2019

(54) PRECODING INFORMATION OBTAINING METHOD, AND DEVICE

(71) Applicants: Huawei Technologies Co., Ltd., Shenzhen (CN); Fraunhofer-Gesellschaft Zur Forderung Der Angewandten Forschung E.V., Munich (DE)

(72) Inventors: Lei Wang, Shanghai (CN); Martin Kurras, Munich (DE); Lars Thiele, Munich (DE); Thomas Haustein, Munich (DE); Dageng Chen, Shanghai (CN); Ye Wu, Shanghai (CN); Deli Qiao, Shenzhen (CN)

(73) Assignees: Huawei Technologies Co., Ltd., Shenzhen (CN); Fraunhofer-Gesellschaft Zur Forderung Der Angewandten Forschung E.V., Munich (DE)

(*) Notice: Subject to any disclaimer, the term of this patent is extended or adjusted under 35 U.S.C. 154(b) by 209 days.

(21) Appl. No.: 15/655,189

(22) Filed: Jul. 20, 2017

(65) Prior Publication Data
US 2017/0317795 A1    Nov. 2, 2017

Related U.S. Application Data

(63) Continuation of application No. PCT/CN2017/071108, filed on Jan. 20, 2015.

(51) Int. Cl.
*H04L 5/00* (2006.01)
*H04L 1/06* (2006.01)
(Continued)

(52) U.S. Cl.
CPC .......... *H04L 5/005* (2013.01); *H04B 7/0639* (2013.01); *H04L 1/06* (2013.01); *H04L 27/261* (2013.01);
(Continued)

(58) Field of Classification Search
CPC ..... H04L 5/005; H04L 5/0051; H04L 27/261; H04L 1/06; H04B 7/0639; H04B 7/0482; H04W 24/10
See application file for complete search history.

(56) References Cited

U.S. PATENT DOCUMENTS

2008/0232494 A1* 9/2008 Pan .............. H04B 7/0426
375/260
2008/0299917 A1* 12/2008 Alexiou ........... H04B 7/0639
455/103
(Continued)

FOREIGN PATENT DOCUMENTS

CN    101594208 A    12/2009
CN    102035619 A    4/2011
(Continued)

OTHER PUBLICATIONS

Office Action, dated May 15, 2019, CN 201580073369.8.

*Primary Examiner* — Ivan O Latorre
(74) *Attorney, Agent, or Firm* — Leydig, Voit & Mayer, Ltd.

(57) ABSTRACT

Embodiments of the present invention provide a precoding information obtaining method and a device. The method includes: separately precoding, by a network device by using N sub-codebooks, a pilot group including K pilots to obtain N precoded pilot groups, where the sub-codebooks are subsets of a precoding codebook, the precoding codebook includes M precoding vectors, each sub-codebook includes K precoding vectors; sending, by the network device, a precoded pilot group to a terminal device in each
(Continued)

of W RB groups; and receiving, by the network device, precoding information fed back by the terminal device for any one of W precoded pilot groups. According to the precoding information obtaining method and the device, a quantity of pilot signals sent by the network device in each RB group is reduced, and pilot overheads in each RB group are reduced.

15 Claims, 5 Drawing Sheets

(51) Int. Cl.
    *H04W 24/10*      (2009.01)
    *H04B 7/06*       (2006.01)
    *H04L 27/06*      (2006.01)
    *H04B 7/0456*     (2017.01)
    *H04L 27/26*      (2006.01)

(52) U.S. Cl.
    CPC ........... *H04W 24/10* (2013.01); *H04B 7/0482* (2013.01); *H04L 5/0023* (2013.01); *H04L 5/0051* (2013.01)

(56) References Cited

U.S. PATENT DOCUMENTS

| | | | |
|---|---|---|---|
| 2009/0196203 A1* | 8/2009 | Taira | H04B 7/0617 370/280 |
| 2011/0026459 A1* | 2/2011 | Tsai | H04B 7/0417 370/328 |
| 2012/0020433 A1* | 1/2012 | Bhattad | H04B 7/0417 375/296 |
| 2012/0026964 A1 | 2/2012 | Koivisto et al. | |
| 2014/0105317 A1 | 4/2014 | Erell et al. | |
| 2015/0016379 A1 | 1/2015 | Nam et al. | |
| 2017/0085303 A1 | 3/2017 | Chen et al. | |
| 2017/0214447 A1* | 7/2017 | Li | H04B 7/04 |

FOREIGN PATENT DOCUMENTS

| | | |
|---|---|---|
| CN | 102158315 A | 8/2011 |
| CN | 102714530 A | 10/2012 |
| CN | 104144027 A | 11/2014 |
| CN | 104184506 A | 12/2014 |
| CN | 104202073 A | 12/2014 |
| JP | 2012004609 A | 1/2012 |
| WO | 2014073805 A1 | 5/2014 |

\* cited by examiner

PRECODING INFORMATION OBTAINING METHOD, AND DEVICE

CROSS-REFERENCE TO RELATED APPLICATIONS

This application is a continuation of International Application No. PCT/CN2015/071108, filed on Jan. 20, 2015, the disclosure of which is hereby incorporated by reference in its entirety.

STATEMENT OF JOINT RESEARCH AGREEMENT

The subject matter and the claimed invention were made by or on the behalf of Huawei Technologies Co., Ltd., of Shenzhen, Guangdong Province, P.R. China and Fraunhofer Heinrich Hertz Institute of Lufthansa Street.27C, Munich, Germany, under a joint research agreement titled "Precoding information obtaining method, and device". The joint research agreement was in effect on or before the claimed invention was made, and that the claimed invention was made as a result of activities undertaken within the scope of the joint research agreement.

TECHNICAL FIELD

Embodiments of the present invention relate to the field of communications technologies, and in particular, to a precoding information obtaining method, and a device.

BACKGROUND

Generally, in a process in which a network device communicates with a terminal device in a communications system, a channel status affects quality of communication between the network device and the terminal device. However, data transmitted in different transmission locations in transmission resources undergoes different channel statuses. To ensure the quality of communication with the terminal device, the network device generally sends, to the terminal device in a downlink timeslot in each resource block (resource block, RB for short) that can be scheduled, a pilot used for channel measurement, so as to obtain precoding information. Specifically, the terminal device determines, according to the received pilot, a channel status undergone by a pilot in each RB. Subsequently, the terminal device traverses all precoding vectors in a configured precoding codebook according to a channel status undergone by a pilot in each RB, determines a precoding vector appropriate to each RB, and feeds back an index of a precoding vector appropriate to each RB to the network device, so that the network device uses an appropriate precoding vector when subsequently sending data information to the terminal device in each RB, so as to ensure the quality of communication with the terminal device.

As mobile communications continuously develops, a next generation cellular communications system is urgently required to improve a system throughput. MIMO (Multiple-Input Multiple-Output, multiple-input multiple-output) is a commonly used technology. That is, a large quantity of antennas are deployed on a network device side to improve the system throughput. Correspondingly, as the quantity of the antennas on the network device side increases, a quantity of pilots sent by the network device in each RB also continuously increases. Therefore, a pilot signal has relatively high overheads in one channel measurement process, and communication efficiency is reduced.

SUMMARY

Embodiments of the present invention provide a precoding information obtaining method and a device, so as to optimize a precoding information obtaining process and improve communication efficiency.

According to a first aspect, an embodiment of the present invention provides a precoding information obtaining method, including:
  separately precoding, by a network device by using N sub-codebooks, a pilot group including K pilots to obtain N precoded pilot groups, where the sub-codebooks are subsets of a precoding codebook, the precoding codebook includes M precoding vectors, each sub-codebook includes K precoding vectors, K is a positive integer, N and M are integers greater than 1, and M is greater than K;
  sending, by the network device, a precoded pilot group to a terminal device in each of W resource block RB groups, where W is a positive integer; and
  receiving, by the network device, precoding information fed back by the terminal device for any one of W precoded pilot groups.

With reference to the first aspect, in a first implementation, the precoding information fed back for the any one of the W precoded pilot groups includes a pilot index, where the pilot index is an index of a precoded pilot in K precoded pilots included in the precoded pilot group.

With reference to the first aspect, in a second implementation, the precoding information fed back for each precoded pilot group of the W precoded pilot groups includes a precoding vector index, where the precoding vector index is an index of a precoding vector corresponding to a precoded pilot in K precoded pilots included in the precoded pilot group.

With reference to any one of the first aspect, or the first to the second implementations of the first aspect, in a third implementation, the method further includes:
  notifying, by the network device, the terminal device of a value of K.

With reference to any one of the first aspect, or the first to the third implementations of the first aspect, in a fourth implementation,
  the network device updates the N sub-codebooks according to the precoding information fed back by the terminal device for the any one of the W precoded pilot groups.

With reference to any one of the first aspect, or the first to the fourth implementations of the first aspect, in a fifth implementation, any two sub-codebooks of the N sub-codebooks are different.

With reference to any one of the first aspect, or the first to the fifth implementations of the first aspect, in a sixth implementation, the sending, by the network device, a precoded pilot group to a terminal device in each of W resource block RB groups includes:
  obtaining, by performing precoding by using a same sub-codebook, precoded pilot groups sent by the network device to the terminal device in at least two of the W RB groups.

With reference to the sixth implementation of the first aspect, in a seventh implementation, W is greater than N.

With reference to any one of the first aspect, or the first to the seventh implementations of the first aspect, in an eighth implementation, the sending operation is performed in each of W RB groups in each downlink subframe.

According to a second aspect, an embodiment of the present invention provides a precoding information obtaining method, including:

receiving, by a terminal device in any one of W resource block RB groups, a precoded pilot group sent by a network device, where the precoded pilot group is obtained by precoding, by the network device by using any one of N sub-codebooks, a pilot group including K pilots, the sub-codebooks are subsets of a precoding codebook, the precoding codebook includes M precoding vectors, each sub-codebook includes K precoding vectors, K is a positive integer, N and M are integers greater than 1, M is greater than K, and W is a positive integer; and feeding back, by the terminal device, precoding information of the any precoded pilot group to the network device according to the any received precoded pilot group.

With reference to the second aspect, in a first implementation, the precoding information of the precoded pilot group includes a pilot index, where the pilot index is an index of a precoded pilot in K precoded pilots included in the precoded pilot group.

With reference to the second aspect, in a second implementation, the precoding information of the precoded pilot group includes a precoding vector index, where the precoding vector index is an index of a precoding vector corresponding to a precoded pilot in K precoded pilots included in the precoded pilot group.

With reference to the first or the second implementation of the second aspect, in a third implementation, a method for determining the precoded pilot in the K precoded pilots included in the any precoded pilot group includes:

determining, by the terminal device according to the K precoded pilots included in the received precoded pilot group, K equivalent channel values corresponding to the K precoded pilots, where an equivalent channel value is a ratio of a precoded pilot received by the terminal device to a to-be-precoded pilot;

determining, by the terminal device, a maximum value in the K equivalent channel values; and determining, by the terminal device, that a precoded pilot corresponding to the maximum value is a precoded pilot in the K precoded pilots included in the any precoded pilot group.

With reference to the first or the second implementation of the second aspect, in a fourth implementation, a method for determining the precoded pilot in the K precoded pilots included in the any precoded pilot group includes:

determining, by the terminal device according to the K precoded pilots included in the received precoded pilot group, K equivalent channel values corresponding to the K precoded pilots, where an equivalent channel value is a ratio of a precoded pilot received by the terminal device to a sum of a to-be-precoded pilot and a channel noise;

determining, by the terminal device, a maximum value in the K equivalent channel values; and determining, by the terminal device, that a precoded pilot corresponding to the maximum value is a precoded pilot in the K precoded pilots included in the any precoded pilot group.

With reference to the third or the fourth implementation of the second aspect, in a fifth implementation, the to-be-precoded pilot is prestored in the terminal device.

With reference to any one of the second aspect, or the first to the fifth implementations of the second aspect, in a sixth implementation, the obtaining method further includes:

receiving, by the terminal device, a value of K sent by the network device; and the receiving, by a terminal device in any one of W resource block RB groups, a precoded pilot group sent by a network device specifically includes:

receiving, by the terminal device in any RB group of the W RB groups, a pilot group that includes K precoded pilots and that is sent by the network device.

According to a third aspect, an embodiment of the present invention provides a device, where the device is a network device and includes:

a precoding module, configured to separately precode, by using N sub-codebooks, a pilot group including K pilots to obtain N precoded pilot groups, where the sub-codebooks are subsets of a precoding codebook, the precoding codebook includes M precoding vectors, each sub-codebook includes K precoding vectors, K is a positive integer, N and M are integers greater than 1, and M is greater than K;

a sending module, configured to send a precoded pilot group to a terminal device in each of W resource block RB groups, where W is a positive integer; and a receiving module, configured to receive precoding information fed back by the terminal device for any one of W precoded pilot groups.

With reference to the third aspect, in a first implementation, the precoding information fed back for the any one of the W precoded pilot groups includes a pilot index, where the pilot index is an index of a precoded pilot in K precoded pilots included in the precoded pilot group.

With reference to the third aspect, in a second implementation, the precoding information fed back for each precoded pilot group of the W precoded pilot groups includes a precoding vector index, where the precoding vector index is an index of a precoding vector corresponding to a precoded pilot in K precoded pilots included in the precoded pilot group.

With reference to any one of the third aspect, or the first to the second implementations of the third aspect, in a third implementation, further including:

the sending module is further configured to notify the terminal device of a value of K.

With reference to any one of the third aspect, or the first to the third implementations of the third aspect, in a fourth implementation, the device further includes an updating module that is configured to update the N sub-codebooks according to the precoding information fed back by the terminal device for the any one of the W precoded pilot groups.

With reference to any one of the third aspect, or the first to the fourth implementations of the third aspect, in a fifth implementation, any two sub-codebooks of the N sub-codebooks are different.

With reference to any one of the third aspect, or the first to the fifth implementations of the third aspect, in a sixth implementation, precoded pilot groups sent by the sending module to the terminal device in at least two of the W RB groups are obtained by performing precoding by using a same sub-codebook.

With reference to the sixth implementation of the third aspect, in a seventh implementation, W is greater than N.

With reference to any one of the third aspect, or the first to the seventh implementations of the third aspect, in an eighth implementation, a sending operation performed by the sending module is performed in each of W RB groups in each downlink subframe.

According to a fourth aspect, an embodiment of the present invention provides a device, where the device is a terminal device and includes:

a receiving module, configured to receive, in any one of W resource block RB groups, a precoded pilot group sent by a network device, where the precoded pilot group is obtained by precoding, by the network device by using any one of N sub-codebooks, a pilot group including K pilots, the sub-codebooks are subsets of a precoding codebook, the precoding codebook includes M precoding vectors, each sub-codebook includes K precoding vectors, K is a positive integer, N and M are integers greater than 1, M is greater than K, and W is a positive integer; and a sending module, configured to feed back precoding information of the any precoded pilot group to the network device according to the any received precoded pilot group.

With reference to the fourth aspect, in a first implementation, the precoding information of the precoded pilot group includes a pilot index, where the pilot index is an index of a precoded pilot in K precoded pilots included in the precoded pilot group.

With reference to the fourth aspect, in a second implementation, the precoding information of the precoded pilot group includes a precoding vector index, where the precoding vector index is an index of a precoding vector corresponding to a precoded pilot in K precoded pilots included in the precoded pilot group.

With reference to the first or the second implementation of the fourth aspect, in a third implementation, the device further includes a determining module that is configured to determine, according to the K precoded pilots included in the received precoded pilot group, K equivalent channel values corresponding to the K precoded pilots, where an equivalent channel value is a ratio of a precoded pilot received by the terminal device to a to-be-precoded pilot;

the determining module is configured to determine a maximum value in the K equivalent channel values; and the determining module is configured to determine that a precoded pilot corresponding to the maximum value is a precoded pilot in the K precoded pilots included in the any precoded pilot group.

With reference to the first or the second implementation of the fourth aspect, in a fourth implementation, the device further includes a determining module that is configured to determine, according to the K precoded pilots included in the received precoded pilot group, K equivalent channel values corresponding to the K precoded pilots, where an equivalent channel value is a ratio of a precoded pilot received by the terminal device to a sum of a to-be-precoded pilot and a channel noise;

the determining module is configured to determine a maximum value in the K equivalent channel values; and the determining module is configured to determine that a precoded pilot corresponding to the maximum value is a precoded pilot in the K precoded pilots included in the any precoded pilot group.

With reference to the third or the fourth implementation of the fourth aspect, in a fifth implementation, the device further includes a storage module that is configured to prestore the to-be-precoded pilot.

With reference to any one of the fourth aspect, or the first to the fifth implementations of the fourth aspect, in a sixth implementation, the receiving module is further configured to receive a value of K sent by the network device, and the receiving module is specifically configured to receive, in any RB group of the W RB groups, a pilot group that includes K precoded pilots and that is sent by the network device.

According to a fifth aspect, an embodiment of the present invention provides a device, where the device is a network device and includes:

a processor, configured to separately precode, by using N sub-codebooks, a pilot group including K pilots to obtain N precoded pilot groups, where the sub-codebooks are subsets of a precoding codebook, the precoding codebook includes M precoding vectors, each sub-codebook includes K precoding vectors, K is a positive integer, N and M are integers greater than 1, and M is greater than K;

a transmitter, configured to send a precoded pilot group to a terminal device in each of W resource block RB groups, where W is a positive integer; and a receiver, configured to receive precoding information fed back by the terminal device for any one of W precoded pilot groups.

With reference to the fifth aspect, in a first implementation, the precoding information fed back for the any one of the W precoded pilot groups includes a pilot index, where the pilot index is an index of a precoded pilot in K precoded pilots included in the precoded pilot group.

With reference to the fifth aspect, in a second implementation, the precoding information fed back for each precoded pilot group of the W precoded pilot groups includes a precoding vector index, where the precoding vector index is an index of a precoding vector corresponding to a precoded pilot in K precoded pilots included in the precoded pilot group.

With reference to any one of the fifth aspect, or the first to the second implementations of the fifth aspect, in a third implementation, further including:

the transmitter is further configured to notify the terminal device of a value of K.

With reference to any one of the fifth aspect, or the first to the third implementations of the fifth aspect, in a fourth implementation, the processor is further configured to update the N sub-codebooks according to the precoding information fed back by the terminal device for the any one of the W precoded pilot groups.

With reference to any one of the fifth aspect, or the first to the fourth implementations of the fifth aspect, in a fifth implementation, any two sub-codebooks of the N sub-codebooks are different.

With reference to any one of the fifth aspect, or the first to the fifth implementations of the fifth aspect, in a sixth implementation, precoded pilot groups sent by the transmitter to the terminal device in at least two of the W RB groups are obtained by performing precoding by using a same sub-codebook.

With reference to the sixth implementation of the fifth aspect, in a seventh implementation, W is greater than N.

With reference to any one of the fifth aspect, or the first to the seventh implementations of the fifth aspect, in an eighth implementation, a sending operation performed by the transmitter is performed in each of W RB groups in each downlink subframe.

According to a sixth aspect, an embodiment of the present invention provides a device, where the device is a terminal device and includes:

a receiver, configured to receive, in any one of W resource block RB groups, a precoded pilot group sent by a network device, where the precoded pilot group is obtained by precoding, by the network device by using any one of N sub-codebooks, a pilot group including K pilots, the sub-codebooks are subsets of a precoding codebook, the precoding codebook includes M precoding vectors, each sub-codebook includes K precoding vectors, K is a positive integer, N and M are integers greater than 1, M is greater than K, and W is a positive integer; and a transmitter, configured to feed back precoding information of the any precoded pilot group to the network device according to the any received precoded pilot group.

With reference to the sixth aspect, in a first implementation, the precoding information of the precoded pilot group includes a pilot index, where the pilot index is an index of a precoded pilot in K precoded pilots included in the precoded pilot group.

With reference to the sixth aspect, in a second implementation, the precoding information of the precoded pilot group includes a precoding vector index, where the precoding vector index is an index of a precoding vector corresponding to a precoded pilot in K precoded pilots included in the precoded pilot group.

With reference to the first or the second implementation of the sixth aspect, in a third implementation, the device further includes a processor that is configured to determine, according to the K precoded pilots included in the received precoded pilot group, K equivalent channel values corresponding to the K precoded pilots, where an equivalent channel value is a ratio of a precoded pilot received by the terminal device to a to-be-precoded pilot;

the processor is configured to determine a maximum value in the K equivalent channel values; and the processor is configured to determine that a precoded pilot corresponding to the maximum value is a precoded pilot in the K precoded pilots included in the any precoded pilot group.

With reference to the first or the second implementation of the sixth aspect, in a fourth implementation, the device further includes a processor that is configured to determine, according to the K precoded pilots included in the received precoded pilot group, K equivalent channel values corresponding to the K precoded pilots, where an equivalent channel value is a ratio of a precoded pilot received by the terminal device to a sum of a to-be-precoded pilot and a channel noise;

the processor is configured to determine a maximum value in the K equivalent channel values; and the processor is configured to determine that a precoded pilot corresponding to the maximum value is a precoded pilot in the K precoded pilots included in the any precoded pilot group.

With reference to the third or the fourth implementation of the sixth aspect, in a fifth implementation, the device further includes a memory that is configured to prestore the to-be-precoded pilot.

With reference to any one of the sixth aspect, or the first to the fifth implementations of the sixth aspect, in a sixth implementation, the receiver is further configured to receive a value of K sent by the network device, and the receiver is specifically configured to receive, in any RB group of the W RB groups, a pilot group that includes K precoded pilots and that is sent by the network device.

Embodiments of the present invention provide a precoding information obtaining method and a device. A network device divides a precoding codebook into multiple sub-codebooks, and a quantity of precoding vectors in each sub-codebook is relatively small. Therefore, a quantity of pilot signals sent by the network device in each RB group is reduced, and pilot overheads in each RB group are reduced. In this way, resources used for data transmission are added while channel measurement is completed, so that a communication capacity of a communications system is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
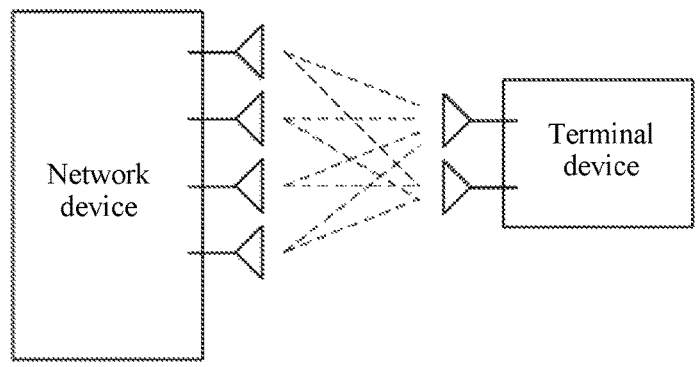
FIG. 1 is a schematic diagram of an application scenario of a precoding information obtaining method according to the present invention.

FIG. 1 is a schematic diagram of an application scenario of a precoding information obtaining method according to the present invention. As shown in FIG. 1, multiple antennas are disposed on a network device, and one or more antennas may be disposed on each terminal device that communicates with the network device. The network device may transmit a to-be-transmitted signal by using each antenna on the network device. After passing through a channel between the network device and the terminal device, a signal transmitted by each antenna is received by an antenna of the terminal device. The terminal device analyzes the received signal, and learns a status of the channel between the terminal device and the network device. It may be understood that the status of the channel between the network device and the terminal device changes in real time. The network device sends information in each transmission location in a resource block RB (resource block). Therefore, information in different transmission locations undergoes different channel statuses. However, information in transmission locations relatively close to each other undergoes similar channel statuses. Therefore, in this embodiment, one RB or multiple adjacent RBs are used as one RB group, and the status of the channel between the network device and the terminal device is measured based on an RB group, so as to obtain precoding information.

The network device may be a device that is configured to communicate with a mobile device. The network device may be a BTS (Base Transceiver Station, base transceiver station) in GSM (Global System of Mobile Communication, Global System for Mobile communications) or CDMA (Code Division Multiple Access, Code Division Multiple Access); may be an NB (NodeB, NodeB) in WCDMA (Wideband Code Division Multiple Access, Wideband Code Division Multiple Access); or may be an eNB or an eNodeB (Evolved Node B, evolved NodeB), an access point in LTE (Long Term Evolution, Long Term Evolution), a vehicle-mounted device, a wearable device, or a network device in a future 5G network, or a network device in a future evolved PLMN (Public Land Mobile Network, public land mobile network).

The terminal device may also be referred to as user equipment (User Equipment), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless communication function, a computing device, or another processing device connected to a wireless modem, a vehicle-mounted device, a wearable device, a terminal device in a future 5G network, or a terminal device in a future evolved PLMN (Public Land Mobile Network, public land mobile network) network.

Figure 2:
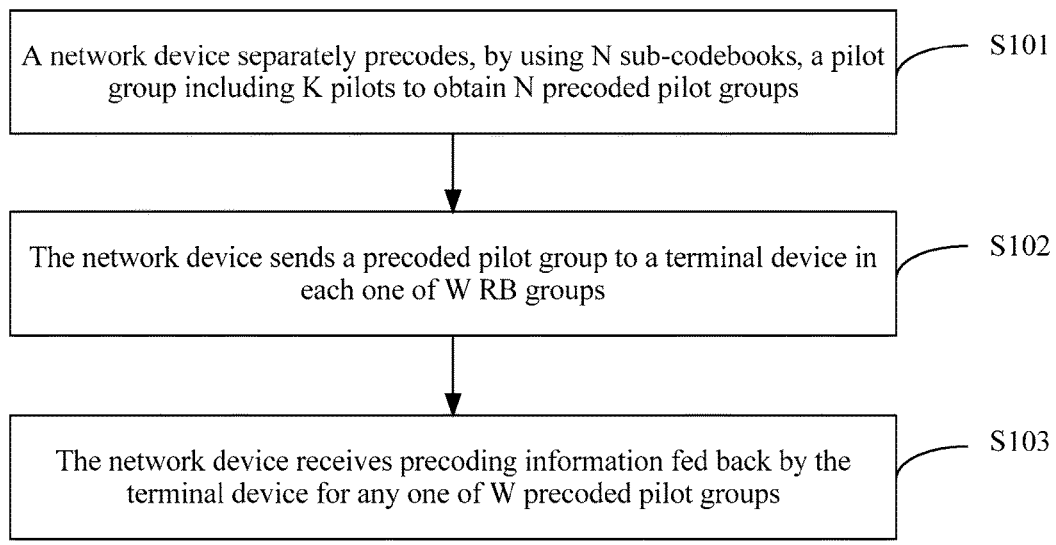
FIG. 2 is a schematic flowchart of Embodiment 1 of a precoding information obtaining method according to the present invention.

Specifically, FIG. 2 is a schematic flowchart of Embodiment 1 of a precoding information obtaining method according to the present invention. As shown in FIG. 2, this embodiment includes the following steps.

S101. A network device separately precodes, by using N sub-codebooks, a pilot group including K pilots to obtain N precoded pilot groups.

The sub-codebooks are subsets of a precoding codebook, the precoding codebook includes M precoding vectors, and each sub-codebook includes K precoding vectors, where K is a positive integer, N and M are integers greater than 1, and M is greater than K.

Specifically, the network device may generate the pilot group including the K pilots by itself. The network device precodes the pilot group by using a first sub-codebook of the N sub-codebooks, and obtains a precoded pilot group, and precodes the pilot group again by using a second sub-codebook of the N sub-codebooks, and obtains another precoded pilot group, and so on. The N sub-codebooks are separately used to precode the same pilot group, and the N precoded pilot groups are obtained. Pilots in the pilot group and precoding vectors in each sub-codebook may be in a one-to-one correspondence. It may be understood as the fact that when a sub-codebook is used to precode the pilot group, the precoding vectors in the sub-codebook is used to precode the pilots in the pilot group in a one-to-one correspondence manner. That is, for a same sub-codebook, different precoding vectors are used to precode different pilots. For example, a precoding vector in the sub-codebook is used to precode a first pilot in the pilot group, and a first precoded pilot is obtained; then, another precoding vector is used to precode a second pilot in the pilot group, and a second precoded pilot is obtained; and by analogy, K precoded pilots are obtained, that is, a precoded pilot group including the K precoded pilots is obtained.

The precoding codebook may be configured by a communications system for the network device according to a communications protocol. That is, it may be considered that the network device divides the precoding codebook and obtains the N sub-codebooks. When T antennas are configured for the network device, each precoding vector in the precoding codebook includes T elements. In addition, preferably, all the pilots in the pilot group are orthogonal to each other.

S102. The network device sends a precoded pilot group to a terminal device in each of W RB groups.

The W RB groups are in a same downlink subframe. Any RB group may include at least one RB or at least two adjacent RBs. RBs included in the W RB groups in a same downlink subframe are all RBs that can be scheduled by the network device in the downlink subframe. That is, the network device groups the RBs that can be scheduled in the downlink subframe to form the W RB groups. W is a positive integer.

S103. The network device receives precoding information fed back by the terminal device for any one of W precoded pilot groups.

In S102, the network device sends the precoded pilot group to the terminal device in each RB group of the W RB groups. After receiving the precoded pilot group in any RB group, the terminal device feeds back precoding information of the RB group to the network device.

A precoded pilot group sent by the network device in any RB group is obtained by precoding a pilot group by the network device by using a sub-codebook in the N sub-codebooks. It may be equivalent to the fact that the network device allocates the sub-codebook to the RB group. Therefore, K to-be-sent precoded pilots in the RB group are obtained by precoding, by the network device by using the sub-codebook allocated to the RB group, the pilot group including the K pilots. Optionally, in consideration of the fact that information in different RB groups undergoes different channel statuses, any two sub-codebooks of the N sub-codebooks are different, so that relatively accurate precoding information may be obtained. Therefore, a probability of allocating a same sub-codebook to the W RB groups is relatively low, so that accurate precoding information may be obtained.

Further, after receiving the precoding information fed back by the terminal device for the any one of the W precoded pilot groups, the network device may learn that which precoding vector in the sub-codebook allocated to the any RB group is appropriate to the RB group. That is, a current channel status is estimated by using the precoding information, so that the network device determines, for the any RB group, a precoding vector that adapts to the current channel status.

In this embodiment, a network device divides a precoding codebook into multiple sub-codebooks, and a quantity of precoding vectors in each sub-codebook is relatively small. Therefore, a quantity of pilot signals sent by the network device in each RB group is reduced, and pilot overheads in each RB group are reduced. In this way, resources used for data transmission are added while channel measurement is completed, so that a communication capacity of a communications system is improved.

Figure 3:
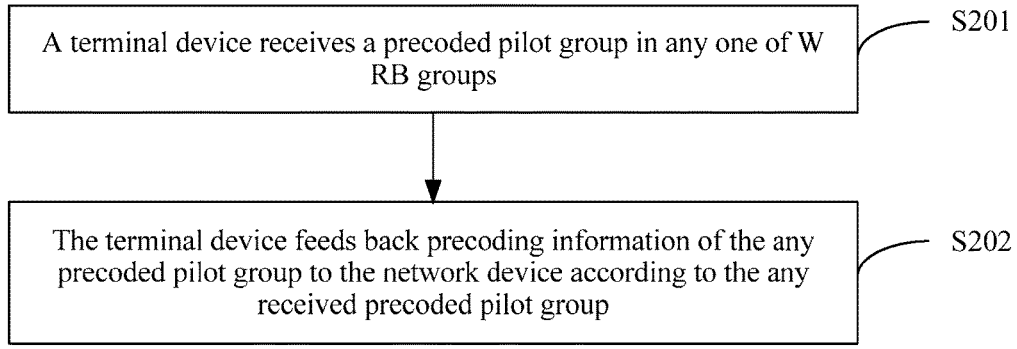
FIG. 3 is a schematic flowchart of Embodiment 2 of a precoding information obtaining method according to the present invention.

FIG. 3 is a schematic flowchart of Embodiment 2 of a precoding information obtaining method according to the present invention. As shown in FIG. 3, this embodiment includes the following steps.

S201. A terminal device receives a precoded pilot group in any one of W RB groups.

The precoded pilot group is obtained by precoding, by a network device by using any one of N sub-codebooks, a pilot group including K pilots. The sub-codebooks are subsets of a precoding codebook, the precoding codebook includes M precoding vectors, and each sub-codebook includes K precoding vectors, where K is a positive integer, N and M are integers greater than 1, M is greater than K, and W is a positive integer.

This embodiment is executed by the terminal device corresponding to the network device. S201 corresponds to S103 in the embodiment shown in FIG. 2. For specific description of the pilot group, the sub-codebook, and the precoded pilot group, refer to S101 to S103.

S202. The terminal device feeds back precoding information of the any precoded pilot group to the network device according to the any received precoded pilot group.

The network device sends a precoded pilot group in all the W RB groups. When receiving, in any RB group of the W RB groups, a precoded pilot group sent by the network device, the terminal device feeds back precoding information of the precoded pilot group to the network device. For example, if the terminal device receives a precoded pilot group in a first RB group of the W RB groups, when feeding back precoding information of the precoded pilot group to the network device, the terminal device specifically feeds back precoding information of the precoded pilot group sent by the network device in the first RB group; if the terminal device receives a precoded pilot group in a $W^{th}$ RB group of the W RB groups, when feeding back precoding information of the precoded pilot group to the network device, the terminal device specifically feeds back precoding information of the precoded pilot group sent by the network device in the $W^{th}$ RB group. It may be understood that if the terminal device receives, in all the W RB groups, a precoded pilot group sent by the network device, when feeding back precoding information of a precoded pilot group, the terminal device feeds back precoding information of W precoded pilot groups to the network device for the W RB groups.

Further, when a precoded pilot group sent by the network device in an RB group is transmitted by using a channel between the network device and the terminal device, the precoded pilot group is affected by a channel status. Therefore, a precoded pilot group received by the terminal device in the RB group is different from the precoded pilot group sent by the network device in the RB group. However, before this embodiment is implemented, the terminal device and the network device may negotiate all pilots (that is, to-be-precoded pilots) in a pilot group used for precoding; alternatively, the terminal device and the network device may prestore the pilot group used for precoding, a precoding codebook, or a precoding sub-codebook. In this way, after receiving any precoded pilot group, the terminal device may determine precoding information of the any precoded pilot group, and then feed back the precoding information of the any precoded pilot group to the network device in S202.

Specifically, a precoded pilot group sent by the network device in each RB group is obtained by performing precoding by using a sub-codebook. A precoding vector included in the sub-codebook is a subset of a precoding vector included in the precoding codebook, and a quantity of precoding vectors included in the sub-codebook may be less than a quantity of precoding vectors included in the precoding codebook. Therefore, a quantity of precoded pilots included in the precoded pilot group sent in each RB group is relatively small, that is, K, which is equal to the quantity of the precoding vectors included in the sub-codebook. When the terminal device determines precoding information of a precoded pilot group for any RB group, the determining is performed based on K precoded pilots sent by the network device in the RB group. However, in the prior art, a quantity of pilots in each RB group is equal to the quantity of the precoding vectors in the precoding codebook, and therefore, for any RB group, the terminal device can determine, only by traversing all the precoding vectors in the precoding codebook based on a large quantity of pilots in the RB group, precoding information of a precoded pilot group sent by the network device in the RB group. In comparison with the prior art, pilot overheads in each RB group are reduced in this embodiment. Therefore, the terminal device determines precoding information based on only a relatively small quantity of pilots in the RB group. Therefore, in this embodiment, the terminal device requires a relatively small computation amount to complete a feedback, so that load of the terminal device is reduced.

In this embodiment, because a pilot group is precoded by using a sub-codebook, for each RB group, a quantity of precoding vectors that need to be used for precoding is reduced, so that a quantity of pilots sent by a network device in each RB group is reduced. Therefore, a terminal device determines precoding information based on only a relatively small quantity of pilots in each RB group. Therefore, in this embodiment, the terminal device requires a relatively small computation amount to complete a feedback of the precoding information, so that burden of the terminal device is reduced.

Figure 4:
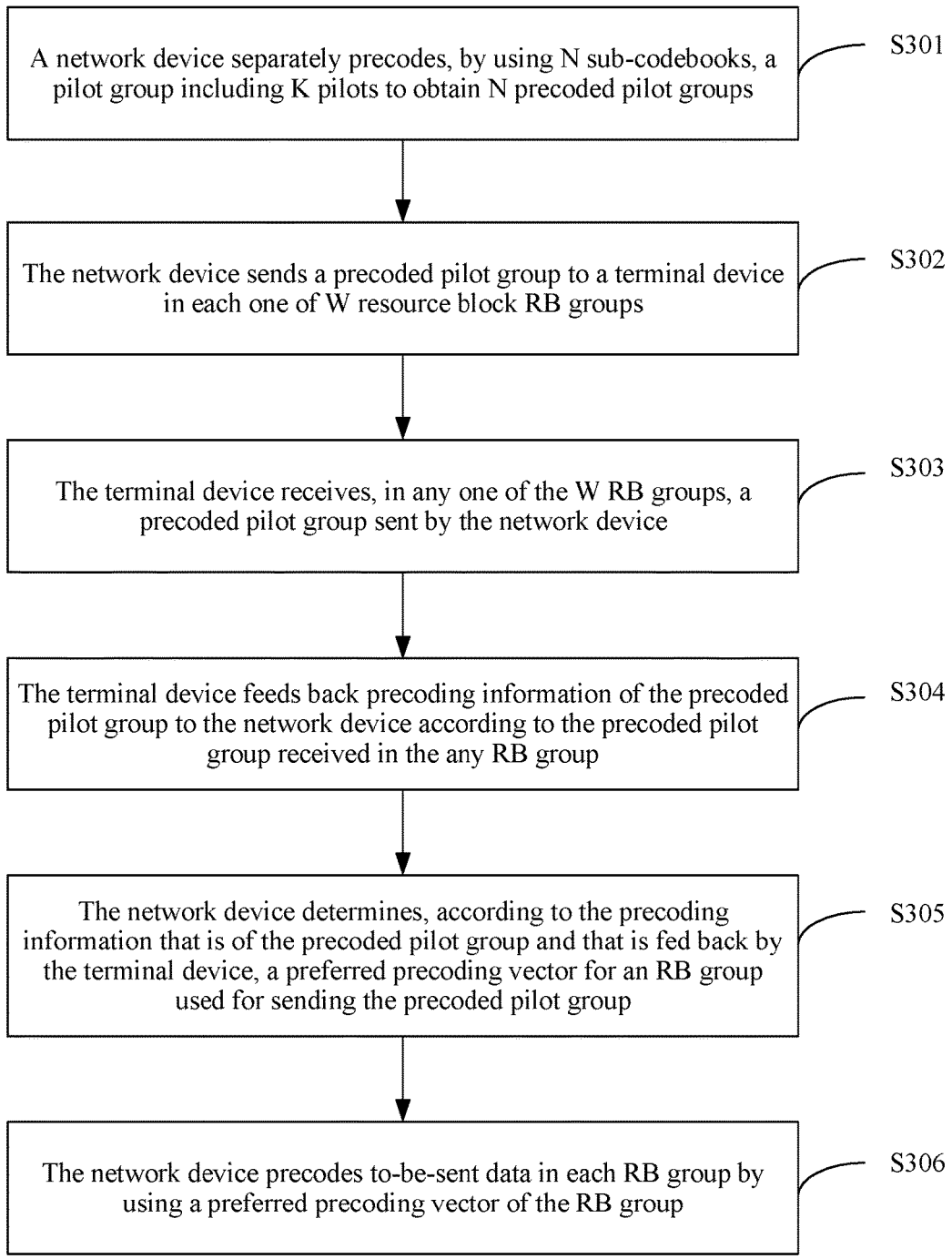
FIG. 4 is a schematic flowchart of Embodiment 3 of a precoding information obtaining method according to the present invention.

FIG. 4 is a schematic flowchart of Embodiment 3 of a precoding information obtaining method according to the present invention. As shown in FIG. 4, this embodiment includes the following steps.

S301. A network device separately precodes, by using N sub-codebooks, a pilot group including K pilots to obtain N precoded pilot groups.

Specifically, one pilot group includes K pilots, and one sub-codebook includes K precoding vectors. K pilot signals are obtained by respectively multiplying the K precoding vectors included in the sub-codebook by the K pilots in the pilot group; that is, one precoded pilot group is obtained.

S302. The network device sends a precoded pilot group to a terminal device in each of W resource block RB groups.

For example, there are 100 RBs that can be scheduled by the network device in one downlink subframe. If the 100 RBs are divided into 100 groups, each RB group includes one RB. One RB may be further divided into transmission locations, and the transmission locations may be indicated by using OFDM (Orthogonal Frequency Division Multiplexing, orthogonal frequency division multiplexing) symbol indexes and subcarrier indexes. One transmission location is used for transmitting one precoded pilot in one precoded pilot group. For example, an obtained precoded pilot group in S301 includes K precoded pilots. Further, when the precoded pilot group is sent in an RB group, the K precoded pilots included in the precoded pilot group are respectively sent in K transmission locations that are used for transmitting pilots (that is, precoded pilots) and that are in the RB group.

Figure 5:
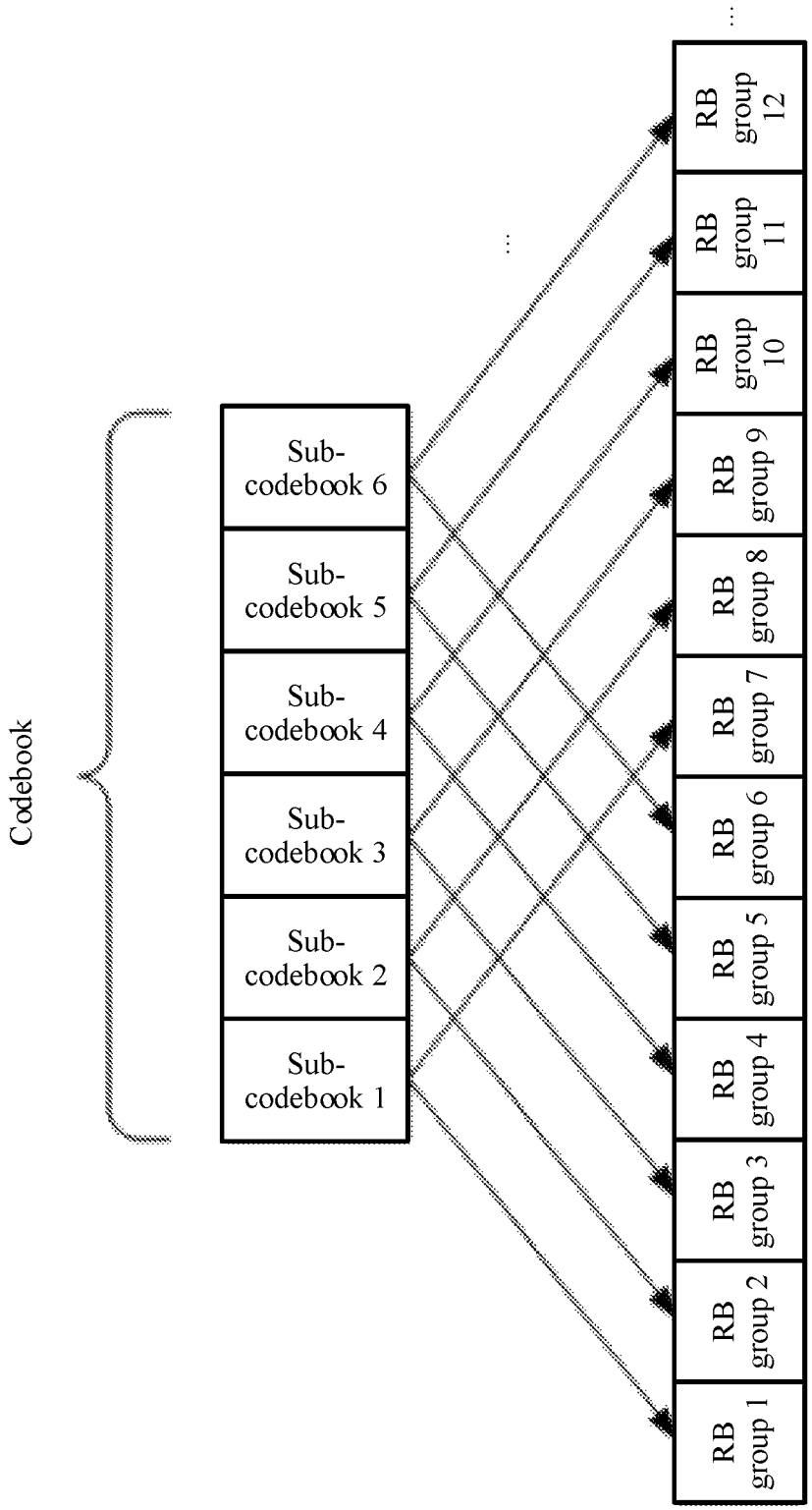
FIG. 5 is a schematic diagram of a sub-codebook according to Embodiment 3 of the present invention.

FIG. 5 is a schematic diagram of a sub-codebook according to Embodiment 3 of the present invention. As shown in FIG. 5, a precoded pilot group sent in a first RB group is obtained by performing precoding by using a sub-codebook 1; a precoded pilot group sent in a second RB group is obtained by performing precoding by using a sub-codebook 2; and by analogy, a precoded pilot group sent in a sixth RB group is obtained by performing precoding by using a sub-codebook 6. Subsequently, starting from a seventh RB group, sub-codebooks 1 to 6 are successively reused to precode pilot groups to obtain precoded pilot groups that need to be sent in a seventh to a twelfth RB groups. By analogy, the six sub-codebooks can be cyclically used. That is, in actual application, N sub-codebooks may be cyclically allocated to each RB group. That is, when W is greater than N, in the W RB groups, a sub-codebook allocated to a $$\left(\left[\frac{W}{N}\right] \cdot N + i\right)^{th}$$

RB group is the same as a sub-codebook allocated to an $i^{th}$ RB group, where "[ ]" indicates a rounding operation, and i is any integer from 1 to W (including 1 and W).

Optionally, the foregoing sending operation is performed in each of W RB groups in each downlink subframe. That is, because a quantity of pilots that need to be transmitted in each RB group in this embodiment is reduced, it is relatively easy to implement an operation of sending a precoded pilot group in each of W RB groups in each downlink subframe. Therefore, S302 or S301 and S302 are performed in each downlink subframe. The network device may measure a channel between the network device and the terminal device in real time to obtain specific precoding information, thereby improving timeliness of obtaining the precoding information by the network device.

S303. The terminal device receives, in any RB group of the W RB groups, a precoded pilot group sent by the network device.

It should be noted that the network device sends K precoded pilots in any RB group. Optionally, before S303, the network device notifies the terminal device of a value of K. Therefore, after the terminal device receives the value of K sent by the network device, the terminal device receives, in any one of W RB groups in each downlink subframe, a pilot group that includes K precoded pilots and that is sent by the network device. More specifically, before the network device and the terminal device implement this embodiment, the network device and the terminal device determine in advance, by means of negotiation, transmission locations that are used for transmitting precoded pilots and that are in each RB group, and information such as content and a size of K to-be-precoded pilots in a to-be-precoded pilot group. That is, for any RB group, the terminal device learns in advance a value of K and K transmission locations used for transmitting precoded pilots. The terminal device receives K precoded pilots in K transmission locations that are used for transmitting precoded pilots and that are in any RB group, that is, receives, in the any RB group, a precoded pilot group sent by the network device.

S304. The terminal device feeds back precoding information of the precoded pilot group to the network device according to the precoded pilot group received in the any RB group.

In this embodiment, the precoding information of the precoded pilot group includes a pilot index, and the pilot index is an index of a precoded pilot in K precoded pilots included in the precoded pilot group. Alternatively, the precoding information of the precoded pilot group includes a precoding vector index, and the precoding vector index is an index of a precoding vector corresponding to a precoded pilot in K precoded pilots included in the precoded pilot group. It may be understood that whether the index of the precoded pilot or the index of the precoding vector is fed back, the index of the precoded pilot or the index of the precoding vector corresponding to the precoded pilot may be first selected, in the precoded pilot group, as a precoded pilot used to feed back the precoding information. That is, a precoded pilot in the K precoded pilots included in the precoded pilot group needs to be selected. Optionally, there may be multiple methods for determining the precoded pilot in the K precoded pilots included in the precoded pilot group. The following describes the methods by using a precoded pilot group in an RB group as an example.

C1. The terminal device determines, according to the K precoded pilots included in the received precoded pilot group, K equivalent channel values corresponding to the K precoded pilots.

The equivalent channel value may be a ratio of a precoded pilot received by the terminal device to a to-be-precoded pilot.

Specifically, in S302, the network device separately sends a precoded pilot group to the terminal device in each RB group of a first to a $W^{th}$ RB groups. That is, a first to a $W^{th}$ precoded pilot groups are sent in total. Correspondingly, the terminal device may receive the first to the $W^{th}$ precoded pilot groups in total in the first to the $W^{th}$ RB groups. An example in which the terminal device receives an $i^{th}$ precoded pilot group of the first to the $W^{th}$ precoded pilot groups in an $i^{th}$ RB group is used for description in detail. An $r^{th}$ precoded pilot in the $i^{th}$ precoded pilot group received by the terminal device is $y_r^i$, and $y_r^i = H^i P_r^i x_r$. $x_r$ is an $r^{th}$ (r is any integer from 1 to K) to-be-precoded pilot in a to-be-precoded pilot group. $P_r^i x_r$ is an $r^{th}$ precoded pilot in an $i^{th}$ precoded pilot group that is of the first to the $W^{th}$ precoded pilot groups and that is sent by the network device. A channel status undergone by any data transmitted in the $i^{th}$ RB group is reflected by using a channel matrix $H^i$. Therefore, after the $r^{th}$ precoded pilot in the $i^{th}$ precoded pilot group sent by the network device in the $i^{th}$ RB group is affected by the channel status, the $r^{th}$ precoded pilot in the $i^{th}$ precoded pilot group received by the terminal device is $y_r^i$. $P_r^i$ is a precoding vector used by the network device to precode $x_r$.

Optionally, before this embodiment is implemented, the network device and the terminal device determine in advance each RB group by means of negotiation. Alternatively, the network device and the terminal device specify in advance each RB group and transmission location used for transmitting each pilot (or a precoded pilot). For example, in S302, the network device precodes a first to a $K^{th}$ pilots (to-be-precoded pilots) in a pilot group (that is, a to-be-precoded pilot group) by using an $S^{th}$ (S is any integer from 1 to N) sub-codebook, and obtains a first to a $K^{th}$ corresponding precoded pilots. Subsequently, the network device sends the first to the $K^{th}$ precoded pilots in K transmission locations that are used for transmitting precoded pilots and that are in the $i^{th}$ RB group. Therefore, the terminal device receives K precoded pilots in the K transmission locations used for transmitting the precoded pilots, and learns in advance K to-be-precoded pilots. For example, the terminal device learns in advance that the network device sends the $r^{th}$ precoded pilot in the $i^{th}$ precoded pilot group in a $q^{th}$ (q is a positive integer and is not greater than a total quantity of the transmission locations in the $i^{th}$ RB group) transmission location; a precoded pilot received by the terminal device in the $q^{th}$ transmission location is $y_r^i$; and the terminal device learns that the precoded pilot sent by the network device in the $q^{th}$ transmission location in the $i^{th}$ RB group is obtained by precoding the to-be-precoded pilot $x_r$. Therefore, the terminal device determines, according to a formula $$\frac{y_r^i}{x_r} = H^i P_r^i,$$

an equivalent channel value $H^i P_r^i$ corresponding to $y_r^i$, and further determines K equivalent channel values corresponding to the K received precoded pilots in the $i^{th}$ precoded RB group.

In addition, an equivalent channel value is a ratio of a precoded pilot received by the terminal device to a sum of a to-be-precoded pilot and a channel noise, and may be mathematically represented for example, as $$\frac{y_r^i}{x_r + N_0} = H^i P_r^i.$$

An equivalent channel value corresponding to $y_r^i$ is determined. $N_0$ is a channel noise.

For another RB group, S304 may be performed by referring to the example of the $i^{th}$ RB group.

C2. The terminal device may determine a maximum value in the K equivalent channel values. Certainly, the maximum value may not be used in an implementation process. For example, a second maximum value may be used.

Flexibly, there may be one or more maximum values. For example, the terminal device may determine one maximum value in the K equivalent channel values as the maximum value, or may determine first Z (Z is a positive integer and is less than K) maximum values in the K equivalent channel values as the maximum values.

C3. The terminal device determines that a precoded pilot corresponding to the maximum value is a precoded pilot in the K precoded pilots included in the any precoded pilot group.

After the precoded pilot in the K precoded pilots included in the any precoded pilot group is determined, the precoding information that needs to be fed back may be determined. For example, when determining, according to C1 to C3, that the equivalent channel value corresponding to $y_r^i$ is the maximum value, the terminal device determines that $y_r^i$ is the precoded pilot in the K precoded pilots in the $i^{th}$ precoded pilot group. It may be understood that $y_r^i$ is formed after $P_r^i x_r$ undergoes a channel status. Therefore, the precoded pilot corresponding to the maximum value may also be $P_r^i x_r$. However, the foregoing C1 to C3 are performed by the terminal device, and from a perspective of the terminal device, the precoded pilot corresponding to the maximum value is $y_r^i$. Further, the precoding information that is determined in S304 and that is of the $i^{th}$ precoded pilot group is r. That is, the network device is notified of an index of the $r^{th}$ precoded pilot sent by the network device in the $i^{th}$ RB group; that is, the network device is notified of the index of the $r^{th}$ precoded pilot received by the terminal device in the $i^{th}$ RB group. ($y_r^i$ is formed after $P_r^i x_r$ undergoes a channel status. For the network device, an index of the sent precoded pilot $P_r^i x_r$ is r, and is the same as an index of the precoded pilot $y_r^i$ received by the terminal device.)

Alternatively, when precoding information of the $i^{th}$ precoded pilot group determined in S304 is r, r may be considered as an index of a precoding vector. The network device precodes $x_r$ by using the precoding vector $P_r^i$ in the $S^{th}$ sub-codebook, and obtains the $r^{th}$ precoded pilot. Therefore, when receiving the precoding information r, the network device may determine, in the $S^{th}$ sub-codebook, the precoding vector $P_r^i$ used to obtain the $r^{th}$ precoded pilot, that is, a precoding vector corresponding to the precoded pilot $P_r^i x_r$ (or $y_r^i$). Therefore, r is also an index of the precoding vector $P_r^i$.

It should be additionally noted that, for ease of description, the precoding vector used by the network device to precode $x_r$ is written as $P_r^i$. That is, $P_r^i$ indicates only a precoding vector used to precode $x_r$. Although precoding vectors in the $S^{th}$ sub-codebook are in a specified sequence, $P_r^i$ is not limited to an $r^{th}$ precoding vector in the $S^{th}$ sub-codebook. Flexibly, when the network device selects a precoding vector, $P_r^i$ may be specifically any precoding vector that is in the $S^{th}$ sub-codebook and that is selected by the network device to precode $x_r$.

Optionally, when performing S304, the terminal device further feeds back a CQI (channel quality indication, channel quality indication) corresponding to the RB group.

It should be additionally noted that, when precoding information of each precoded pilot group includes a pilot index, when completing a feedback of the precoding information, the terminal device does not need to learn specific content of a precoding vector corresponding to each precoded pilot, and does not need to obtain, by means of calculation, specific content of a precoded pilot sent by the network device or a channel status (a channel matrix) undergone by the precoded pilot; the terminal device needs to determine only K equivalent channel values according to K received precoded pilots, and may subsequently complete the feedback of the precoding information according to a maximum value in the K equivalent channel values.

Optionally, after the network device receives precoding information of each precoded pilot group of W precoded pilot groups, the network device further performs the following steps.

S305. The network device determines, according to the precoding information that is of the precoded pilot group and that is fed back by the terminal device, a preferred preceding vector for an RB group used for sending the precoded pilot group.

The $i^{th}$ RB group is used as an example. When precoding information that is of a precoded pilot group in the $i^{th}$ RB group and that is received in S304 is r, it is determined that the precoding vector $P_r^i$ used to obtain the precoded pilot $P_r^i x_r$ is the preferred precoding vector. That is, the $r^{th}$ precoding vector $P_r^i$ in the $S^{th}$ sub-codebook may be directly determined as the preferred precoding vector.

S306. The network device precodes to-be-sent data in each RB group by using a preferred precoding vector of the RB group.

A preferred precoding vector of each RB group adapts to the RB group. Therefore, when sending data to the terminal device by scheduling a specific RB group, the network device precodes to-be-sent data by using a preferred precoding vector that adapts to the RB group, so that a channel status has relatively little impact on the data in a transmission process.

In this embodiment, a network device divides a precoding codebook into multiple sub-codebooks, and a quantity of precoding vectors in each sub-codebook is relatively small. Therefore, a quantity of pilot signals sent by the network device in each RB group is reduced, and pilot overheads in each RB group are reduced. In this way, resources used for data transmission are added while channel measurement is completed, so that a communication capacity of a communications system is improved.

Figure 6:
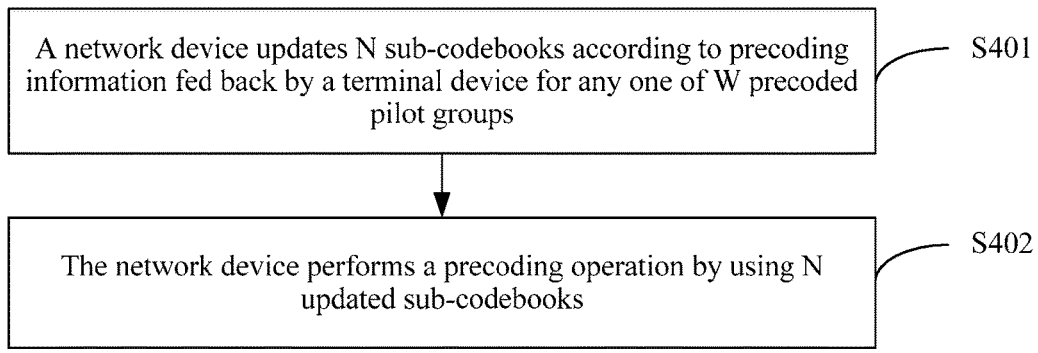
FIG. 6 is a schematic flowchart of Embodiment 4 of a precoding information obtaining method according to the present invention.

FIG. 6 is a schematic flowchart of Embodiment 4 of a precoding information obtaining method according to the present invention. As shown in FIG. 6, this embodiment gives further description based on Embodiment 1 to Embodiment 3.

S401. A network device updates N sub-codebooks according to precoding information fed back by a terminal device for any one of W precoded pilot groups.

It may be understood that there are multiple terminal devices in a communications network. The network device and each terminal device perform S301 to S304 in downlink subframe. That is, the network device determines a to-be-replaced precoding vector in the N sub-codebooks according to precoding information fed back by each terminal device for any one of the W precoded pilot groups in a preset quantity of feedbacks.

Specifically, the network device may send, to the terminal device in each of W RB groups in each downlink subframe, a pilot group precoded by the network device. Subsequently, the network device may continuously collect statistics about precoding information that is fed back by each terminal device for multiple times, and determines the to-be-replaced precoding vector in the N sub-codebooks. The to-be-replaced precoding vector should meet the following condition:an index that is of a pilot obtained by using the to-be-replaced precoding vector by the network device is not included in all precoding information fed back by any terminal device in the preset quantity of feedbacks; or an index of the to-be-replaced precoding vector is not included in precoding information fed back by any terminal device in the preset quantity of feedbacks. That is, the to-be-replaced precoding vector is a precoding vector related to precoding information that is not fed back by a terminal device in the preset quantity of feedbacks. It may be learned that the to-be-replaced precoding vector has relatively poor precoding performance, and needs to be replaced, so as to update a sub-codebook.

For example, the network device learns, by means of statistics collection, that an index that is of a precoded pilot obtained by using a $K^{th}$ precoding vector in a second sub-codebook by the network device is not included in indexes of all precoded pilots fed back by two terminal devices in five feedbacks. Therefore, it may be determined that the $K^{th}$ precoding vector in the second sub-codebook is the to-be-replaced precoding vector; or the network device learns, by means of statistics collection, that an index of a $K^{th}$ precoding vector in a second sub-codebook is not included in indexes of all precoding vectors fed back by two terminal devices in five feedbacks. Therefore, it may be determined that the $K^{th}$ precoding vector in the second sub-codebook is the to-be-replaced precoding vector.

S402. The network device performs a precoding operation by using N updated sub-codebooks.

A sub-codebook is a subset of a precoding codebook. Therefore, when the sub-codebook is updated, it is equivalent to the fact that the precoding codebook is updated. In this embodiment, the network device dynamically adjusts a precoding vector or each sub-codebook in real time based on a change of a channel status, so that adaptability between a precoding vector used by the network device for precoding and the channel status is continuously improved, and precoding performance of the network device is improved.

In addition, the network device may further determine a first sub-codebook in the N sub-codebooks according to precoding information fed back by each terminal device for each precoded pilot group of the W precoded pilot groups in the preset quantity of feedbacks, and a quantity of precoding vectors that are used as preferred precoding vectors and that are in precoding vectors included in the first sub-codebook meets a preset value. Specifically, it may be learned according to S305 and S306 that the precoding information fed back by the terminal device is used to determine a preferred precoding vector that adapts to each RB group. For example, the network device obtains, by means of statistics collection, precoding information that is of precoded pilot groups obtained by performing precoding by using a first to an $N^{th}$ sub-codebooks and that is fed back by the terminal device, and separately determines a preferred precoding vector in each sub-codebook according to the precoding information. Each sub-codebook is a subset of the precoding codebook. Precoding vectors included in any two different sub-codebooks may include same precoding vectors. Therefore, if the network device learns, after determining a preferred precoding vector in each sub-codebook, that a quantity of preferred precoding vectors that are in N determined preferred precoding vectors and that are precoding vectors in a fourth sub-codebook (which is merely used as an example) exceeds a preset quantity, it may be considered that the fourth sub-codebook has relatively good precoding performance, and precoded pilot groups obtained by performing precoding by using the fourth sub-codebook may be sent in at least two RB groups. That is, the network device may flexibly update a sub-codebook according to precoding information that is fed back by the terminal device and that is continuously received by the network device. In addition, when the network device sends a pilot group to the terminal device again according to the fed-back precoding information, that is, performs S301 and S302 again, the precoded pilot groups sent to the terminal device in the at least two of the W RB groups are obtained by performing precoding by using a same sub-codebook.

In this embodiment, a network device may flexibly adjust, by using received precoding information fed back by a terminal device, a sub-codebook used for precoding, so that adaptability between a precoding vector used by the network device for precoding and a channel status is continuously improved, and precoding performance of the network device is improved.

Figure 7:
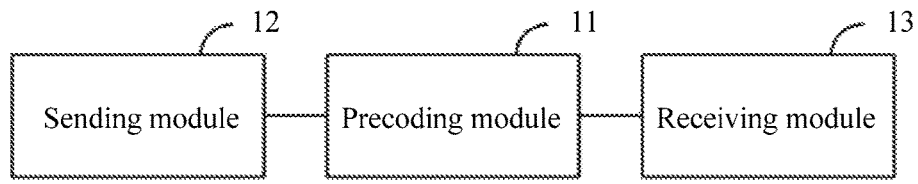
FIG. 7 is a schematic structural diagram of Embodiment 1 of a device according to the present invention.

FIG. 7 is a schematic structural diagram of Embodiment 1 of a device according to the present invention. As shown in FIG. 7, the device is a network device and includes:

a precoding module 11, configured to separately precode, by using N sub-codebooks, a pilot group including K pilots to obtain N precoded pilot groups, where the sub-codebooks are subsets of a precoding codebook, the precoding codebook includes M precoding vectors, each sub-codebook includes K precoding vectors, K is a positive integer, N and M are integers greater than 1, and M is greater than K;

a sending module 12, configured to send a precoded pilot group to a terminal device in each of W resource block RB groups, where W is a positive integer; and a receiving module 13, configured to receive precoding information fed back by the terminal device for any one of W precoded pilot groups.

In this embodiment, a network device divides a precoding codebook into multiple sub-codebooks, and a quantity of precoding vectors in each sub-codebook is relatively small. Therefore, a quantity of pilot signals sent by the network device in each RB group is reduced, and pilot overheads in each RB group are reduced. In this way, resources used for data transmission are added while channel measurement is completed, so that a communication capacity of a communications system is improved.

Figure 8:
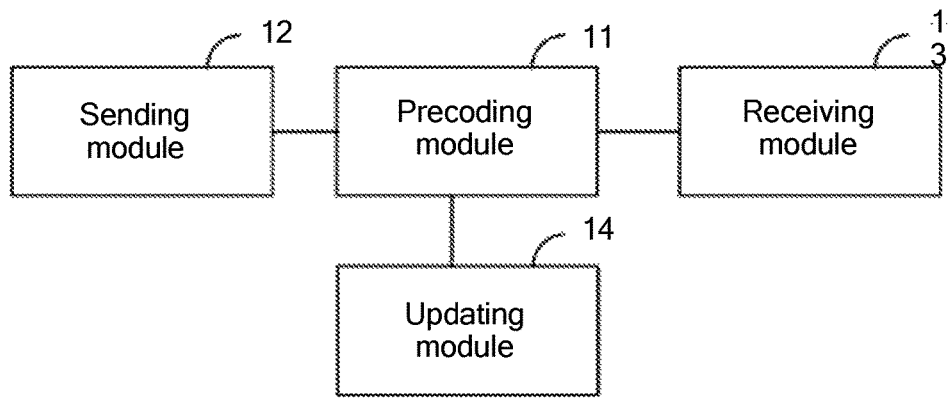
FIG. 8 is a schematic structural diagram of Embodiment 2 of a device according to the present invention.

FIG. 8 is a schematic structural diagram of Embodiment 2 of a device according to the present invention. As shown in FIG. 8, this embodiment gives further description based on the embodiment shown in FIG. 7, and is specifically as follows.

The precoding information fed back for the any one of the W precoded pilot groups includes a pilot index, and the pilot index is an index of a precoded pilot in K precoded pilots included in the precoded pilot group.

Alternatively, the precoding information fed back for each precoded pilot group of the W precoded pilot groups includes a precoding vector index, and the precoding vector index is an index of a precoding vector corresponding to a precoded pilot in K precoded pilots included in the precoded pilot group; in addition, optionally, W is greater than N.

Further, the sending module 12 is further configured to notify the terminal device of a value of K.

Further, the device further includes an updating module 14 that is configured to update the N sub-codebooks according to the precoding information fed back by the terminal device for the any one of the W precoded pilot groups.

Optionally, any two sub-codebooks of the N sub-codebooks are different.

Flexibly, precoded pilot groups sent by the sending module 12 to the terminal device in at least two of the W RB groups are obtained by performing precoding by using a same sub-codebook.

Flexibly, a sending operation performed by the sending module 12 is performed in each of W RB groups in each downlink subframe.

In this embodiment, a network device divides a precoding codebook into multiple sub-codebooks, and a quantity of precoding vectors in each sub-codebook is relatively small. Therefore, a quantity of pilot signals sent by the network device in each RB group is reduced, and pilot overheads in each RB group are reduced. In this way, resources used for data transmission are added while channel measurement is completed, so that a communication capacity of a communications system is improved.

Figure 9:
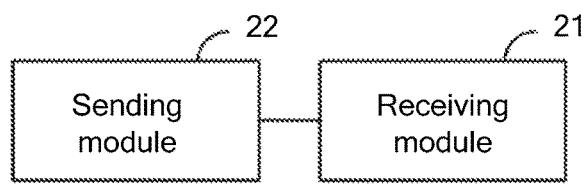
FIG. 9 is a schematic structural diagram of Embodiment 3 of a device according to the present invention.

FIG. 9 is a schematic structural diagram of Embodiment 3 of a device according to the present invention. As shown in FIG. 9, the device in this embodiment is a terminal device and includes:

a receiving module 21, configured to receive, in any one of W resource block RB groups, a precoded pilot group sent by a network device, where the precoded pilot group is obtained by precoding, by the network device by using any one of N sub-codebooks, a pilot group including K pilots, the sub-codebooks are subsets of a precoding codebook, the precoding codebook includes M precoding vectors, each sub-codebook includes K precoding vectors, K is a positive integer, N and M are integers greater than 1, M is greater than K, and W is a positive integer; and a sending module 22, configured to feed back precoding information of the any precoded pilot group to the network device according to the any received precoded pilot group.

In this embodiment, because a pilot group is precoded by using a sub-codebook, for each RB group, a quantity of precoding vectors that need to be used for precoding is reduced, so that a quantity of pilots sent by a network device in each RB group is reduced. Therefore, a terminal device determines precoding information based on only a relatively small quantity of pilots in each RB group. Therefore, in this embodiment, the terminal device requires a relatively small computation amount to complete a feedback of the precoding information, so that burden of the terminal device is reduced.

Figure 10:
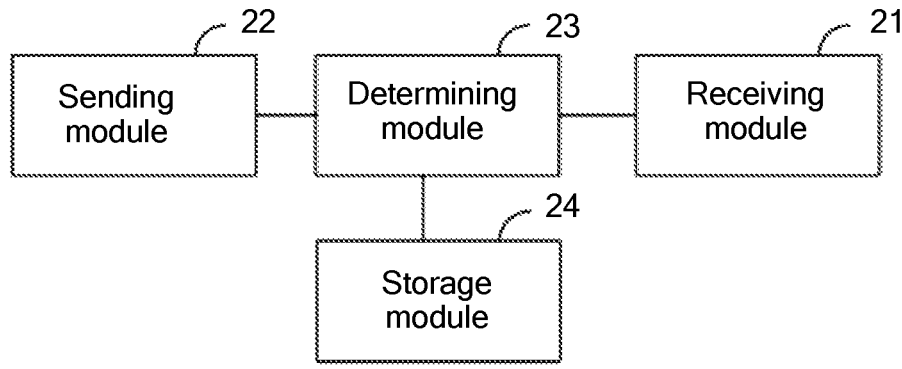
FIG. 10 is a schematic structural diagram of Embodiment 4 of a device according to the present invention.

FIG. 10 is a schematic structural diagram of Embodiment 4 of a device according to the present invention. As shown in FIG. 10, this embodiment gives further description based on the embodiment shown in FIG. 9, and is specifically as follows.

The precoding information of the precoded pilot group includes a pilot index, and the pilot index is an index of a precoded pilot in K precoded pilots included in the precoded pilot group. Alternatively, the precoding information of the precoded pilot group includes a precoding vector index, and the precoding vector index is an index of a precoding vector corresponding to a precoded pilot in K precoded pilots included in the precoded pilot group.

Flexibly, the device further includes a determining module 23 that is configured to determine, according to the K precoded pilots included in the received precoded pilot group, K equivalent channel values corresponding to the K precoded pilots, where an equivalent channel value is a ratio of a precoded pilot received by the terminal device to a to-be-precoded pilot.

The determining module 23 is configured to determine a maximum value in the K equivalent channel values.

The determining module 23 is configured to determine that a precoded pilot corresponding to the maximum value is a precoded pilot in the K precoded pilots included in the any precoded pilot group.

Optionally, the determining module 23 is configured to determine, according to the K precoded pilots included in the received precoded pilot group, K equivalent channel values corresponding to the K precoded pilots, where an equivalent channel value is a ratio of a precoded pilot received by the terminal device to a sum of a to-be-precoded pilot and a channel noise.

The determining module 23 is configured to determine a maximum value in the K equivalent channel values.

The determining module 23 is configured to determine that a precoded pilot corresponding to the maximum value is a precoded pilot in the K precoded pilots included in the any precoded pilot group.

Optionally, the device further includes a storage module 24 that is configured to prestore the to-be-precoded pilot.

The receiving module 21 is further configured to receive a value of K sent by the network device, and the receiving module is specifically configured to receive, in any RB group of the W RB groups, a pilot group that includes K precoded pilots and that is sent by the network device.

In this embodiment, because a pilot group is precoded by using a sub-codebook, for each RB group, a quantity of precoding vectors that need to be used for precoding is reduced, so that a quantity of pilots sent by a network device in each RB group is reduced. Therefore, a terminal device determines precoding information based on only a relatively small quantity of pilots in each RB group. Therefore, in this embodiment, the terminal device requires a relatively small computation amount to complete a feedback of the precoding information, so that burden of the terminal device is reduced.

Figure 11:
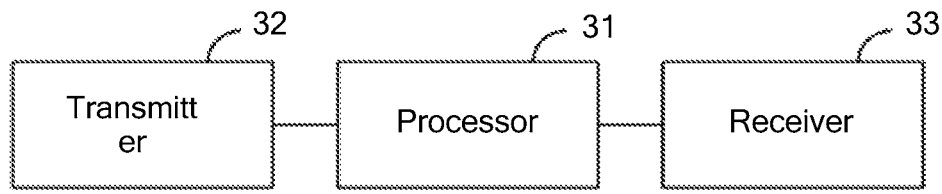
FIG. 11 is a schematic structural diagram of Embodiment 5 of a device according to the present invention.

FIG. 11 is a schematic structural diagram of Embodiment 5 of a device according to the present invention. As shown in FIG. 11, the device is a network device and includes:

a processor 31, configured to separately precode, by using N sub-codebooks, a pilot group including K pilots to obtain N precoded pilot groups, where the sub-codebooks are subsets of a precoding codebook, the precoding codebook includes M precoding vectors, each sub-codebook includes K precoding vectors, K is a positive integer, N and M are integers greater than 1, and M is greater than K;

a transmitter 32, configured to send a precoded pilot group to a terminal device in each of W resource block RB groups, where W is a positive integer; and a receiver 33, configured to receive precoding information fed back by the terminal device for any one of W precoded pilot groups.

Further, the precoding information fed back for the any one of the W precoded pilot groups includes a pilot index, and the pilot index is an index of a precoded pilot in K precoded pilots included in the precoded pilot group. Alternatively, the precoding information fed back for each precoded pilot group of the W precoded pilot groups includes a precoding vector index, and the precoding vector index is an index of a precoding vector corresponding to a precoded pilot in K precoded pilots included in the precoded pilot group. Flexibly, W is greater than N.

Further, the transmitter 32 is further configured to notify the terminal device of a value of K.

The processor 31 is further configured to update the N sub-codebooks according to the precoding information fed back by the terminal device for the any one of the W precoded pilot groups.

Optionally, any two sub-codebooks of the N sub-codebooks are different.

Optionally, precoded pilot groups sent by the transmitter 32 to the terminal device in at least two of the W RB groups are obtained by performing precoding by using a same sub-codebook.

Optionally, a sending operation performed by the transmitter 32 is performed in each of W RB groups in each downlink subframe.

In this embodiment, a network device divides a precoding codebook into multiple sub-codebooks, and a quantity of precoding vectors in each sub-codebook is relatively small. Therefore, a quantity of pilot signals sent by the network device in each RB group is reduced, and pilot overheads in each RB group are reduced. In this way, resources used for data transmission are added while channel measurement is completed, so that a communication capacity of a communications system is improved.

Figure 12:
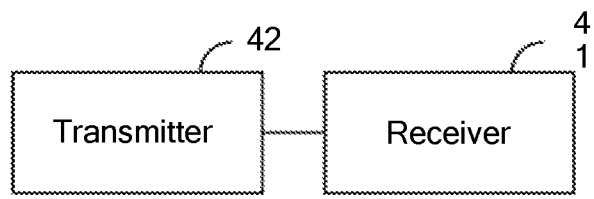
FIG. 12 is a schematic structural diagram of Embodiment 6 of a device according to the present invention.

FIG. 12 is a schematic structural diagram of Embodiment 6 of a device according to the present invention. As shown in FIG. 12, the device is a terminal device and includes:

a receiver 41, configured to receive, in any one of W resource block RB groups, a precoded pilot group sent by a network device, where the precoded pilot group is obtained by precoding, by the network device by using any one of N sub-codebooks, a pilot group including K pilots, the sub-codebooks are subsets of a precoding codebook, the precoding codebook includes M precoding vectors, each sub-codebook includes K precoding vectors, K is a positive integer, N and M are integers greater than 1, M is greater than K, and W is a positive integer; and a transmitter 42, configured to feed back precoding information of the any precoded pilot group to the network device according to the any received precoded pilot group.

In this embodiment, because a pilot group is precoded by using a sub-codebook, for each RB group, a quantity of precoding vectors that need to be used for precoding is reduced, so that a quantity of pilots sent by a network device in each RB group is reduced. Therefore, a terminal device determines precoding information based on only a relatively small quantity of pilots in each RB group. Therefore, in this embodiment, the terminal device requires a relatively small computation amount to complete a feedback of the precoding information, so that burden of the terminal device is reduced.

Figure 13:
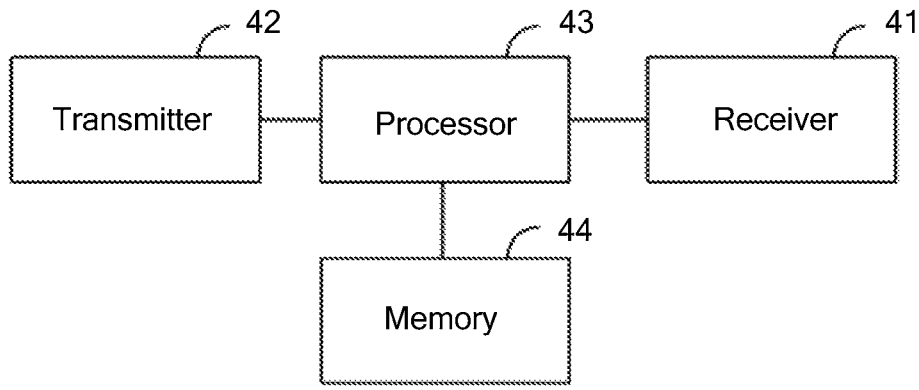
FIG. 13 is a schematic structural diagram of Embodiment 7 of a device according to the present invention.

FIG. 13 is a schematic structural diagram of Embodiment 7 of a device according to the present invention. As shown in FIG. 13, this embodiment gives further description based on the embodiment shown in FIG. 12, and is specifically as follows.

The precoding information of the precoded pilot group includes a pilot index, and the pilot index is an index of a precoded pilot in K precoded pilots included in the precoded pilot group. Alternatively, the precoding information of the precoded pilot group includes a precoding vector index, and the precoding vector index is an index of a precoding vector corresponding to a precoded pilot in K precoded pilots included in the precoded pilot group.

Further, the device further includes a processor 43 that is configured to determine, according to the K precoded pilots included in the received precoded pilot group, K equivalent channel values corresponding to the K precoded pilots, where an equivalent channel value is a ratio of a precoded pilot received by the terminal device to a to-be-precoded pilot.

The processor 43 is configured to determine a maximum value in the K equivalent channel values.

The processor 43 is configured to determine that a precoded pilot corresponding to the maximum value is a precoded pilot in the K precoded pilots included in the any precoded pilot group.

Alternatively, the processor 43 included in the device is configured to determine, according to the K precoded pilots included in the received precoded pilot group, K equivalent channel values corresponding to the K precoded pilots, where an equivalent channel value is a ratio of a precoded pilot received by the terminal device to a sum of a to-be-precoded pilot and a channel noise.

The processor 43 is configured to determine a maximum value in the K equivalent channel values.

The processor 43 is configured to determine that a precoded pilot corresponding to the maximum value is a precoded pilot in the K precoded pilots included in the any precoded pilot group.

Further, the device further includes a memory 44 that is configured to prestore the to-be-precoded pilot.

The receiver 41 is further configured to receive a value of K sent by the network device, and the receiver 41 is specifically configured to receive, in any RB group of the W RB groups, a pilot group that includes K precoded pilots and that is sent by the network device.

In this embodiment, because a pilot group is precoded by using a sub-codebook, for each RB group, a quantity of precoding vectors that need to be used for precoding is reduced, so that a quantity of pilots sent by a network device in each RB group is reduced. Therefore, a terminal device determines precoding information based on only a relatively small quantity of pilots in each RB group. Therefore, in this embodiment, the terminal device requires a relatively small computation amount to complete a feedback of the precoding information, so that burden of the terminal device is reduced.

It should be noted that all modules and devices (such as a processor, a transmitter, and a receiver) in the device embodiments correspondingly perform the method embodiments. For specific implementation details and technical solutions, refer to the method embodiments.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A precoding information obtaining method, comprising:
   receiving, by a terminal device in any one of W resource block (RB) groups, a precoded pilot group sent by a network device, wherein the precoded pilot group is obtained by precoding, by the network device using any one of N sub-codebooks, a pilot group comprising K pilots, the sub-codebooks are subsets of a precoding codebook, the precoding codebook comprises M precoding vectors, each sub-codebook comprises K precoding vectors, K is a positive integer, N and M are integers greater than 1, M is greater than K, and W is a positive integer;
   feeding back, by the terminal device, precoding information of the precoded pilot group to the network device according to the precoded pilot group, wherein the precoding information of the precoded pilot group comprises a pilot index, and the pilot index is an index of a precoded pilot in K precoded pilots comprised in the precoded pilot group; and
   determining the precoded pilot in the K precoded pilots comprised in the precoded pilot group by:
      determining, by the terminal device according to the K precoded pilots comprised in the received precoded pilot group, K equivalent channel values corresponding to the K precoded pilots, wherein an equivalent channel value is a ratio of a precoded pilot received by the terminal device to a to-be-precoded pilot;
      determining, by the terminal device, a maximum value in the K equivalent channel values; and
      determining, by the terminal device, that a precoded pilot corresponding to the maximum value is a precoded pilot in the K precoded pilots comprised in the precoded pilot group.

2. The method according to claim 1, wherein the precoding information of the precoded pilot group comprises a precoding vector index, and the precoding vector index is an index of a precoding vector corresponding to a precoded pilot in K precoded pilots comprised in the precoded pilot group.

3. The method according to claim 1, wherein the to-be-precoded pilot is prestored in the terminal device.

4. The obtaining method according to claim 1, further comprising:
   receiving, by the terminal device, a value of K sent by the network device; and the receiving, by a terminal device in any one of W resource block RB groups, a precoded pilot group sent by a network device comprises:
   receiving, by the terminal device in any RB group of the W RB groups, a pilot group that comprises K precoded pilots and that is sent by the network device.

5. A precoding information obtaining method, comprising:
   receiving, by a terminal device in any one of W resource block (RB) groups, a precoded pilot group sent by a network device, wherein the precoded pilot group is obtained by precoding, by the network device using any one of N sub-codebooks, a pilot group comprising K pilots, the sub-codebooks are subsets of a precoding codebook, the precoding codebook comprises M precoding vectors, each sub-codebook comprises K precoding vectors, K is a positive integer, N and M are integers greater than 1, M is greater than K, and W is a positive integer;
   feeding back, by the terminal device, precoding information of the precoded pilot group to the network device according to the precoded pilot group, wherein the precoding information of the precoded pilot group comprises a pilot index, and the pilot index is an index of a precoded pilot in K precoded pilots comprised in the precoded pilot group; and
   determining the precoded pilot in the K precoded pilots comprised in the precoded pilot group by:
      determining, by the terminal device according to the K precoded pilots comprised in the received precoded pilot group, K equivalent channel values corresponding to the K precoded pilots, wherein an equivalent channel value is a ratio of a precoded pilot received by the terminal device to a sum of a to-be-precoded pilot and a channel noise;
      determining, by the terminal device, a maximum value in the K equivalent channel values; and
      determining, by the terminal device, that a precoded pilot corresponding to the maximum value is a precoded pilot in the K precoded pilots comprised in the precoded pilot group.

6. A device, wherein the device is a terminal device and comprises:
- a receiving module, configured to receive, in any one of W resource block (RB) groups, a precoded pilot group sent by a network device, wherein the precoded pilot group is obtained by precoding, by the network device using any one of N sub-codebooks, a pilot group comprising K pilots, the sub-codebooks are subsets of a precoding codebook, the precoding codebook comprises M precoding vectors, each sub-codebook comprises K precoding vectors, K is a positive integer, N and M are integers greater than 1, M is greater than K, and W is a positive integer;
- a sending module, configured to feed back precoding information of the precoded pilot group to the network device according to the precoded pilot group, wherein the precoding information of the precoded pilot group comprises a pilot index, and the pilot index is an index of a precoded pilot in K precoded pilots comprised in the precoded pilot group; and
- a determining module that is configured to determine, according to the K precoded pilots comprised in the received precoded pilot group, K equivalent channel values corresponding to the K precoded pilots, and an equivalent channel value is a ratio of a precoded pilot received by the terminal device to a to-be-precoded pilot;
- the determining module is configured to determine a maximum value in the K equivalent channel values; and
- the determining module is configured to determine that a precoded pilot corresponding to the maximum value is a precoded pilot in the K precoded pilots comprised in the precoded pilot group.

7. The device according to claim 6, wherein the precoding information of the precoded pilot group comprises a precoding vector index, and the precoding vector index is an index of a precoding vector corresponding to a precoded pilot in K precoded pilots comprised in the precoded pilot group.

8. The device according to claim 6, wherein the device further comprises a storage module that is configured to prestore the to-be-precoded pilot.

9. The device according to claim 6, wherein the receiving module is further configured to receive a value of K sent by the network device, and the receiving module is configured to receive, in any RB group of the W RB groups, a pilot group that comprises K precoded pilots and that is sent by the network device.

10. A device, wherein the device is a terminal device and comprises:
- a receiving module, configured to receive, in any one of W resource block (RB) groups, a precoded pilot group sent by a network device, wherein the precoded pilot group is obtained by precoding, by the network device using any one of N sub-codebooks, a pilot group comprising K pilots, the sub-codebooks are subsets of a precoding codebook, the precoding codebook comprises M precoding vectors, each sub-codebook comprises K precoding vectors, K is a positive integer, N and M are integers greater than 1, M is greater than K, and W is a positive integer;
- a sending module, configured to feed back precoding information of the precoded pilot group to the network device according to the precoded pilot group, wherein the precoding information of the precoded pilot group comprises a pilot index, and the pilot index is an index of a precoded pilot in K precoded pilots comprised in the precoded pilot group; and
- a determining module that is configured to determine, according to the K precoded pilots comprised in the received precoded pilot group, K equivalent channel values corresponding to the K precoded pilots, and an equivalent channel value is a ratio of a precoded pilot received by the terminal device to a sum of a to-be-precoded pilot and a channel noise;
- the determining module is configured to determine a maximum value in the K equivalent channel values; and
- the determining module is configured to determine that a precoded pilot corresponding to the maximum value is a precoded pilot in the K precoded pilots comprised in the precoded pilot group.

11. A device, wherein the device is a terminal device and comprises:
- a receiver, configured to receive, in any one of W resource block (RB) groups, a precoded pilot group sent by a network device, wherein the precoded pilot group is obtained by precoding, by the network device using any one of N sub-codebooks, a pilot group comprising K pilots, the sub-codebooks are subsets of a precoding codebook, the precoding codebook comprises M precoding vectors, each sub-codebook comprises K precoding vectors, K is a positive integer, N and M are integers greater than 1, M is greater than K, and W is a positive integer;
- a transmitter, configured to feed back precoding information of the precoded pilot group to the network device according to the precoded pilot group, wherein the precoding information of the precoded pilot group comprises a pilot index, and the pilot index is an index of a precoded pilot in K precoded pilots comprised in the precoded pilot group; and
- a processor that is configured to determine, according to the K precoded pilots comprised in the received precoded pilot group, K equivalent channel values corresponding to the K precoded pilots, and an equivalent channel value is a ratio of a precoded pilot received by the terminal device to a to-be-precoded pilot;
- the processor is configured to determine a maximum value in the K equivalent channel values; and
- the processor is configured to determine that a precoded pilot corresponding to the maximum value is a precoded pilot in the K precoded pilots comprised in the precoded pilot group.

12. The device according to claim 11, wherein the precoding information of the precoded pilot group comprises a precoding vector index, and the precoding vector index is an index of a precoding vector corresponding to a precoded pilot in K precoded pilots comprised in the precoded pilot group.

13. The device according to claim 11, wherein the device further comprises a memory that is configured to prestore the to-be-precoded pilot.

14. The device according to claim 11, wherein the receiver is further configured to receive a value of K sent by the network device, and the receiver is configured to receive, in any RB group of the W RB groups, a pilot group that comprises K precoded pilots and that is sent by the network device.

15. A device, wherein the device is a terminal device and comprises:
- a receiver, configured to receive, in any one of W resource block (RB) groups, a precoded pilot group sent by a network device, wherein the precoded pilot group is obtained by precoding, by the network device using any one of N sub-codebooks, a pilot group comprising K pilots, the sub-codebooks are subsets of a precoding codebook, the precoding codebook comprises M precoding vectors, each sub-codebook comprises K precoding vectors, K is a positive integer, N and M are integers greater than 1, M is greater than K, and W is a positive integer;

a transmitter, configured to feed back precoding information of the precoded pilot group to the network device according to the precoded pilot group, wherein the precoding information of the precoded pilot group comprises a pilot index, and the pilot index is an index of a precoded pilot in K precoded pilots comprised in the precoded pilot group; and a processor that is configured to determine, according to the K precoded pilots comprised in the received precoded pilot group, K equivalent channel values corresponding to the K precoded pilots, and an equivalent channel value is a ratio of a precoded pilot received by the terminal device to a sum of a to-be-precoded pilot and a channel noise;

the processor is configured to determine a maximum value in the K equivalent channel values; and the processor is configured to determine that a precoded pilot corresponding to the maximum value is a precoded pilot in the K precoded pilots comprised in the precoded pilot group.

* * * * *